United States Patent [19]

Lewus

[11] Patent Number: 4,853,569
[45] Date of Patent: Aug. 1, 1989

[54] NOISE SUPPRESSION CIRCUIT FOR CAPACITOR MOTORS

[76] Inventor: Alexander J. Lewus, 9844 N. 11th Ave., Phoenix, Ariz. 85021

[21] Appl. No.: 204,344

[22] Filed: Jun. 9, 1988

[51] Int. Cl.⁴ .................. H02K 11/00; H02P 1/44
[52] U.S. Cl. .................. 310/68 E; 318/795; 318/793
[58] Field of Search .......... 310/68 A, 68 B, 68 E, 310/68 R; 318/729, 739, 740, 749, 785, 786, 787, 789, 790, 793, 794, 795, 816, 817

[56] References Cited

U.S. PATENT DOCUMENTS 3,573,579 4/1971 Lewus .......................... 318/221
4,734,601 3/1988 Lewus .......................... 310/68 E Primary Examiner—Patrick R. Salce
Assistant Examiner—Judson H. Jones
Attorney, Agent, or Firm—LaValle D. Ptak

[57] ABSTRACT

A noise suppression circuit is provided for capacitor-start and capacitor-run alternating current motors. To prevent rotor chattering and noise from occurring upon disconnection of power from the motor, separate switches are used to connect alternating current power to the windings and to the capacitor; so that when power is disconnected, the capacitor is prevented from discharging into the motor windings. A power dissipation resistor is connected in parallel with the capacitor to permit the capacitor to discharge.

18 Claims, 2 Drawing Sheets

NOISE SUPPRESSION CIRCUIT FOR CAPACITOR MOTORS

RELATED PATENT

This application is related to my U.S. Pat. No. 4,734,601, issued Mar. 29, 1988.

BACKGROUND

Single phase alternating current electric motors conventionally are provided with two windings on a stator core, inductively coupled to the rotor of the motor. Such motors are widely used for a variety of different purposes and range in size from very small fractional horsepower motors on up to multiple horsepower sizes. Single phase motors are particularly popular since most home and business alternating current supplies are in the form of single phase power supplies.

The two windings of single phase electric motors comprise a start winding and a run winding which are connected to the source of operating power. These two stator windings surround and are inductively coupled to the rotor which rotates a shaft to produce the motor output. Rotors are made in a number of different configurations, such as squirrel cage rotors, high resistance rotors, low resistance rotors, wound rotors or multiple winding high and low resistance rotors. All of these configurations, along with various stator winding arrangements are well known in the electric motor industry.

Typically, the start winding is made of relatively small diameter wire and the run winding is made of relatively large diameter wire compared to the diameter of the start winding. These windings are physically and electrically, angularly displaced from one another on the stator.

In conventional capacitor-start and capacitor-start-/capacitor-run motors, a starting capacitor is connected in series with the starting winding and a switch. At motor start-up, the switch is closed and the capacitor, in conjunction with the relatively small diameter start winding, produces a leading current in the starting winding which is approximately equal to and approximately 90° displaced in phase from the lagging current in the main or run winding of the motor. Such arrangements produce high values of starting torque.

Usually the switch in a conventional capacitor-start motor is a centrifugal or thermal switch or it is a current operated switch connected in series with the capacitor and start winding across the input terminals. The run winding then is connected in parallel with this series-connected starting circuit. In such capacitor start motors, the starting condition is such that the instantaneous locked rotor current is high and the motor starting current demand factor also is high. As a consequence, such motors undergo relatively high operating temperatures and require some type of switch for disconnecting or opening the start winding circuit after a pre-established rotational speed of the motor is reached. Because the start winding of such motors generally is a relatively small diameter wire, overheating can and frequently does occur. Such overheating can result in a relatively limited life of the start winding due to burnout. This is the reason for the switch to disconnect the start winding from the motor circuitry after some pre-established operating condition has been reached.

Capacitor run motors also are utilized to produce relatively high starting torque, but instead of opening the circuit or switching out the start winding and capacitor during the operation of the motor, the start winding and capacitor remain in circuit throughout the operation. The parameters of the capacitor and start winding, however, are selected such that the primary current through the motor during its normal operation takes place through the run winding, with only a smaller residual current flowing through the start winding and the capacitor.

A third type of motor incorporates both capacitor start and capacitor run features with a starting capacitor being switched out of the circuit after the start-up conditions are met and a parallel run capacitor remains in the circuit, so that after start-up, this motor operates in the same manner as a conventional capacitor-run motor.

Motors of all of the above types also may employ the series-resonant capacitor configuration of my co-pending application, Ser. No. 07/144,544.

Conventional capacitor motors of the different types discussed above, and the motors of my co-pending application, Ser. No. 07/144,544, all are subject to an inherent operating disadvantage which takes place when the motor is turned off or switched to its "off" position. When the power supply is disconnected from the motor windings, such motors, particularly capacitor-run or capacitor-start/capacitor-run motors, are quite noisy as a result of capacitor discharge taking place through one or both of the windings immediately following the opening of the power switch to the motor. This noise is due to vibration or chattering of the rotor caused by the somewhat erratic discharge current through the operating coils of the motor. In addition, arcing across switch contacts also takes place and can be heard. This chattering and arcing is detrimental to the life of the motors in addition to being annoying. The condition is particularly noticeable for large horsepower motors which have relatively large capacitors in the motor circuits.

It is desirable to provide a motor which has the advantages of prior art capacitor motors, but which does not have the disadvantages of noise and vibration when the motor is turned off.

SUMMARY OF THE INVENTION

Accordingly, it is an object of this invention to provide an improved alternating current motor.

It is another object of this invention to provide an improved alternating current capacitor motor.

It is an additional object of this invention to provide an improved single phase alternating current capacitor motor which is not subject to vibration and noise when the motor is switched off.

It is a further object of this invention to provide an improved alternating current capacitor motor which isolates the capacitor from the motor windings when the motor is turned off.

In accordance with a preferred embodiment of this invention, an alternating current motor operated from a source of single phase alternating current power has first and second windings on a stator core and inductively coupled to a rotor. A capacitor is connected in series with one of the windings, and an energy dissipation device is connected across the terminals of the capacitor. At least two switches are provided to supply and remove operating potential to the windings and capacitor from the source of alternating current power, and these switches are opened together and closed together. The arrangement of the switch contacts is selected such that when the switches are open, the capacitor is prevented from discharging into either of the motor windings.

DETAILED DESCRIPTION

Reference now should be made to the drawings in which the same reference numbers are used throughout the different figures to designate the same or similar components.

Figure 1:
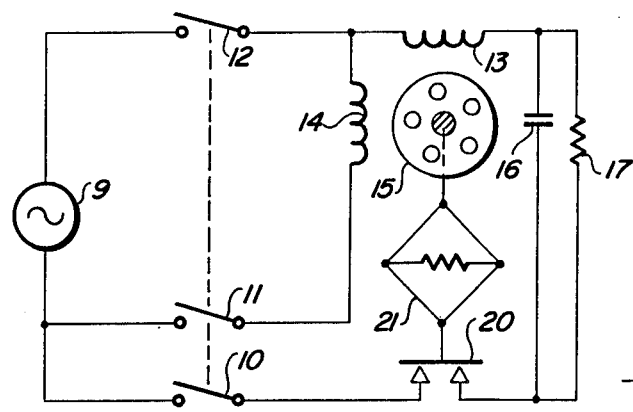
FIG. 1 is a schematic diagram of a preferred embodiment of a capacitor-start motor according to the invention.

FIG. 1 is a schematic diagram of a preferred embodiment of the invention, illustrated in conjunction with a capacitor-start motor. The motor shown is operated from a single phase alternating current power source 9. In FIG. 1, alternating current power is supplied from the power source 9 through a three-pole single-throw power switch 10, 11 and 12. A start winding 13 and a run winding 14 are wound on the stator core of the motor in a conventional manner for a capacitor-start motor, with substantially 90° electrical angular displacement between them. When the switch contacts 10, 11 and 12 are closed, the windings 13 and 14 essentially are connected in parallel with one another, with the winding 13 connected in series with a start capacitor 16 and a set of switch contacts 20 across the end terminals of the run winding 14.

In operation, when the switch contacts 10, 11 and 12 of the circuit of FIG. 1 initially are closed, the motor functions as a conventional "capacitor-start" motor. The capacitor 16, in conjunction with the start winding 13, which is a relatively small diameter winding compared to the wire size of the winding 14, produces a leading current in the start winding 13 which is approximately equal to and approximately 90° displaced in phase from the lagging current in the run winding 14. This produces a high starting torque in the rotor 15 of the motor, as is well known.

A centrifugal switch 20, 21 is illustrated as connected in series with the starting capacitor 16 and the start winding 13. When a pre-established rotational speed of the rotor 15 is reached, a centrifugal switch operator 21, coupled to the rotor 15 in a conventional manner, opens the contacts 20 and removes the start capacitor 16 from the circuit. An energy dissipating resistor 17, connected across the capacitor 16, dissipates any energy stored in the capacitor 16 at the time the switch 20 opens. It also should be noted that the winding 13 is completely removed from further operation of the motor when the switch 20 opens, since the winding 13 is connected in series with the capacitor 16. Thus, the subsequent operation of the motor of FIG. 1 is effected solely through power applied through the run winding 14. This is the conventional operation of a "capacitor-start" motor.

When it is desired to interrupt or terminate operation of the motor of FIG. 1, the ganged switch contacts 10, 11, and 12 are opened. This removes operating power from both ends of the winding 14 (through the now opened switches 11 and 12). Opening of the switch 10 isolates the lower end of the winding 14 from the capacitor 16 and the right hand end of the winding 13; so that at such time as the motor speed drops to a point where the contacts 20 once again are closed, as a result of the centrifugal switch operator 21 resuming its "start" state of operation, the open switch contact 10 provides isolation to prevent any possible effect of residual charge of the capacitor 16 on the rotor 15. This insures that the motor remains in its standby condition of operation and that completely silent, and arcless turn-off of the motor is effected. The motor remains in the standby condition illustrated in FIG. 1 until such time as the ganged switch contacts 10, 11 and 12 once again are closed to restart the motor. When this is done, the foregoing cycle of operation is repeated.

Figure 2:
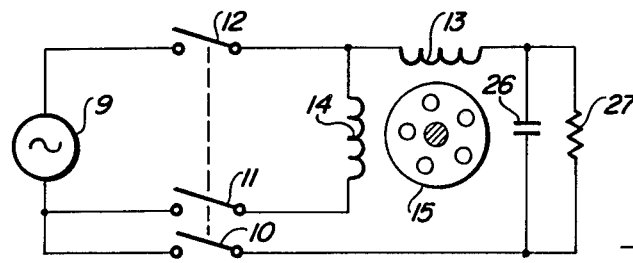
FIG. 2 is a schematic diagram of a capacitor-run motor according to the invention.

FIG. 2 illustrates a variation of the embodiment of FIG. 1 directed to a capacitor-run motor configuration. No separate starting capacitor is used in the embodiment of FIG. 2, but instead, a capacitor 26 is connected in series with the start winding 13 between the switch contacts 10 and 12. An energy disspating resistor 27, similar to the resistor 17 of FIG. 1, is connected across the terminals of the capacitor 26. When the motor of FIG. 2 is to be run, the ganged switch contacts 10, 11 and 12 are closed to apply operating power from the alternating current source 9 to the motor windings 13 and 14 and the capacitor 26 in the same manner as describede above in conjunction with the embodiment of FIG. 1.

When the motor of FIG. 2 attains the desired operating speed of the rotor 15, however, the capacitor 26 is not disconnected from the circuit; but the capacitor 26 connected in series with the start winding 13 serves to limit the amount of current flowing through the start winding. Thus, the primary operating current for the motor of FIG. 2 flows through the run winding 14, in a manner similar to the motor of FIG. 1. Consequently, operation of the motor of FIG. 2 from the time it is first turned on through the duration of the normal operation is the same as for a standard motor.

When operation is to be terminated, the ganged switch contacts 10, 11 and 12 are opened together or simultaneously, as in the manner of the embodiment of FIG. 1 described above. As is readily apparent from an examination of FIG. 2, the switch contacts 10 and 11 are interconnected with the capacitor 26 and the run winding 14, respectively, in such a manner that there is no discharge path for the capacitor 26 through either of the windings 13 or 14. Consequently, the capacitor 26 discharges entirely through the energy dissipating resistor 27.

In a conventional capacitor-run motor, the lower terminal of the capacitor 26 is connected directly to the lower terminal of the run winding 14. This junction then is connected through a single switch (such as either one of the switch contacts 10 or 11) to the source of operating potential. In contrast, by the utilization of the two different switches 10 and 11 (of course in conjunction with the switch 12) in the circuit of FIG. 2, an open circuit is provided for the capacitor 26; and no closed loop through any of the windings exists when the motor is turned off. As a consequence, a completely noiseless turn off of the motor is accomplished, even for large horsepower motors. There is no chattering or vibration imparted to the rotor 15, and it is simply allowed to coast to a stop (unless dynamic braking is employed).

It should be noted that the embodiments of FIGS. 1 and 2 both function in a similar manner to one another to insure that the capacitor 16 or 26 is completely isolated from the motor windings 13 and 14 at the time the motor is turned off. This isolation commences at the instant of motor turn off. While the switch contacts 10 and 11 are shown to isolate the capacitor from the bottom end of the winding 14, it should be noted that the capacitor 26 could be connected in common with the bottom end of the winding 14 through one or the other of switches 10, so long as the other (the upper ends as shown in FIGS. 1 and 2) ends of the windings 13 and 14 then are connected through separate switches to the upper terminal of the power supply. The same result would take place, and this is an alternative arrangement of switches which could be employed, if desired. Such an alternative switch arrangement is illustrated in the embodiment of FIG. 6, described subsequently.

Figure 4:
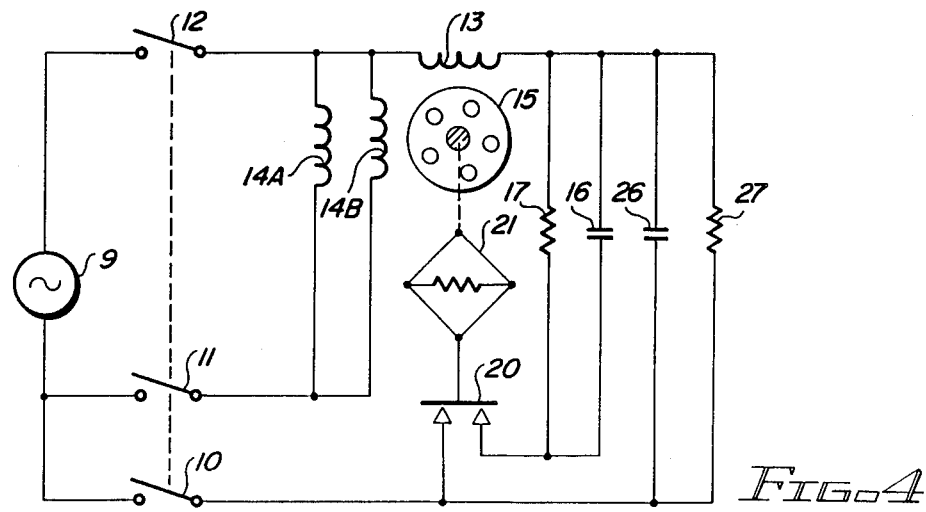
Figure 5:
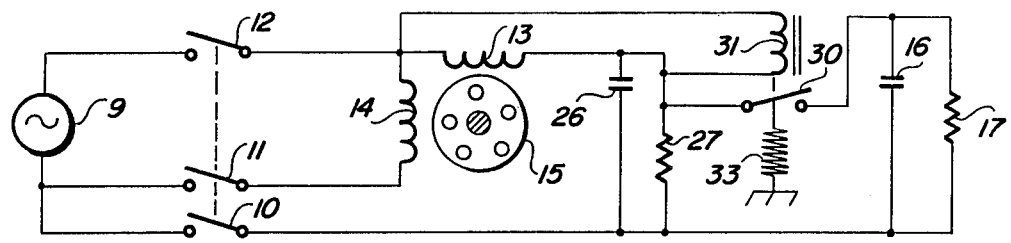
Figure 6:
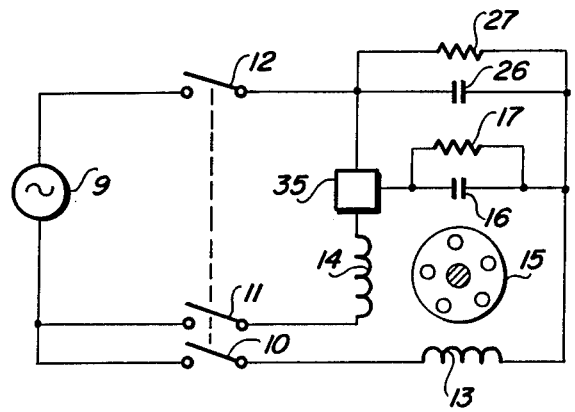

FIGS. 3 through 7 illustrate different versions of capacitor-start/capacitor-run motors which combine the features of the embodiments of FIGS. 1 and 2. The operations of the embodiments of these five figures fundamentally are the same as described above in conjunction with FIGS. 1 and 2. In the embodiments of FIGS. 3 through 7, however, the run capacitor 26, and the associated power dissipating resistor 27, are connected in parallel with the series-connected start capacitor 16 and switch 20 (FIGS. 3 and 4), switch 30 (FIGS. 5 and 7) or switching device 35 (FIG. 6).

Figure 3:
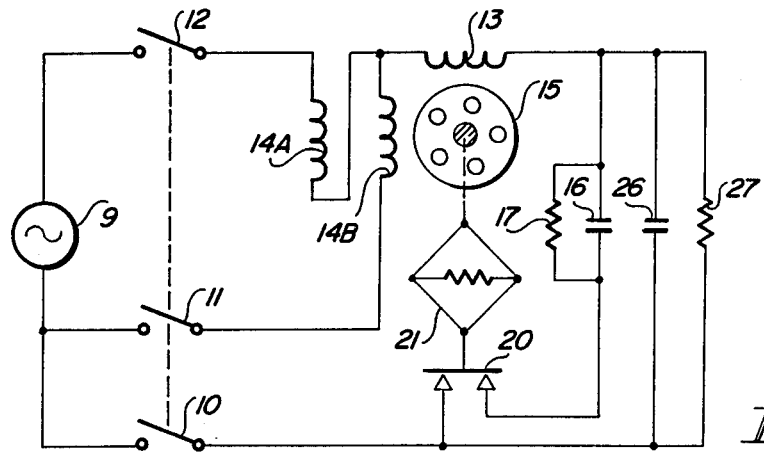
FIGS. 3 through 7 are schematic diagrams of additional embodiments of capacitor-start/capacitor-run motors according to the invention.

In FIGS. 3 and 4, a switch 20, which is the same as the switch 20 of FIG. 1, is opened by a centrifugal operator 21 in the same manner as described above in conjunction with FIG. 1. This removes the starting capacitor 16 from operation in the circuit during the normal run operation of the motor. Since the capacitor 26, however, remains connected in series with the start winding 13, so long as the switch contacts 10, 11 and 12 are closed, the remainder of the operation of the motors shown in FIGS. 3 and 4 essentially is the same as the operation of the motor described above in conjunction with FIG. 2. The run windings of the motors shown in FIGS. 3 and 4, however, are illustrated as a variation of the single run winding 14 shown in FIG. 2. In FIG. 3, the run winding comprises two series-connected sections 14A and 14B; and in FIG. 4, the run winding is illustrated as two parallel-connected sections 14A and 14B. In all other respects, the operation of the circuits of FIGS. 3 and 4 is the same as the circuit of FIG. 2 after the desired operating rotational speed of the rotor 15 is achieved.

When the motors of either FIG. 3 or FIG. 4 are turned off by opening the ganged switch contacts 10, 11 and 12, isolation of both of the capacitors 16 and 26 is effected in the same manner described above in conjunction with FIGS. 1 and 2. Consequently, noiseless or quiet turn off of the motors of FIGS. 3 and 4 is effected without any chattering or vibration and without arcing across contacts, since the capacitors 16 and 26 discharge solely through the power dissipating resistors 17 and 27, respectively.

The embodiment of FIG. 5 is similar to the one of FIGS. 3 and 4 except that the centrifugally operated switch 20 is replaced with a voltage sensitive starting relay comprising a normally closed contact set 30 and an operating coil 31. The contact 30 is held normally closed by a spring 33, so the starting capacitor 16 is connected in cirucit with the start winding 13 during the standby and start conditions of operation of the motor. Once sufficient operating current flows through the coil 31 (connected in parallel with the start winding 13), the contact 30 is opened and the starting capacitor 16 is removed from the circuit. This causes an operation which is similar to the one described above in conjunction with FIGS. 1, 3 and 4 for the opening of the contacts 20. So long as the motor of FIG. 5 remains operating, it functions as a conventional capacitor-run motor of the type described above in conjunction with FIG. 2. When the ganged contacts 10, 11 and 12 are opened, quiet turn off of the motor is accomplished in the same manner described above in conjunction with FIGS. 1 through 4.

FIG. 6 illustrates a variation of a capacitor-start/capacitor-run motor which uses a solid state current relay 35 of the type disclosed in my U.S. Pat. No. 3,573,579. This solid state current relay operates in a manner similar to the centrifugal switch 20/21 of FIGS. 1, 3 and 4, and the voltage relay 30, 31 of FIG. 5, to disconnect the start capacitor 16 from the circuit once the rotor 15 of the motor has attained the desired operating speed.

FIG. 6 differs from the embodiments of FIGS. 1 through 5, however, in another manner, inasmuch as instead of interconnecting the windings 13 and 14 at a common junction or terminal, these windings are separately connected to one side of the power source 9 through the switch contacts 10 and 11. The switch contact 12 then is used to connect and disconnect the upper terminal of the power supply 9 from a common junction of the run capacitor 26 and the run winding 14 (as effected through the solid state current relay circuit 35). The operation of the circuit of FIG. 6, however, when the ganged switch contacts 10, 11 and 12 are opened, serves to isolate the capacitors 16 and 26 from both of the windings 13 and 14 in a manner which is equivalent to the isolation provided by the switch arrangements shown in FIGS. 1 through 5. Consequently, when the operation of the motor of FIG. 6 is to be terminated, the switches 10, 11 and 12 are openend and a silent, arcless turn-off of the motor is effected.

In the embodiments of FIGS. 1 through 6, a three-pole single-throw switch (comprising contacts 10, 11 and 12) is used to connect the alternating current power source 9 to the motor windings 13 and 14 and the various capacitors 16 and 26. In actual construction, the two poles 10 and 11 of the switch are interconnected with a wire jumper on the stationary contact side which is connected to the alternating current power source 9. The other side of the switch, to which the moveable contactors 10 and 11 are connected, is connected as described above to provide the desired isolation between the capacitors and the motor windings to prevent any capacitor discharge from taking place through either of the motor windings 13 and 14 when the motor is turned off. Completion of the circuit is effected through the switch contacts 12 which are connected to the other side of the alternating current power source 9 in the manner described above. This forms a complete circuit for operating the motor.

It also should be noted that a two-pole single-throw switch comprising a pair of contacts 11 and 12 may be used, with these contacts connected in the same manner in the same positions as illustrated in all of the embodiments of FIGS. 1 through 6. In such a circuit, however, the switch contact 10 is not used, but a grounded circuit connection is made between the lower terminal of the alternating current power source 9 and the windings and capacitors of the various embodiments in place of the switch 10. In such a circuit, the operation is the same as if a switch contact, such as the switch contact 10, is permanently closed and the lower terminal of the power source 9 then is connected to ground. The operation of such circuits to isolate the circuit windings from the capacitors upon turn-off is the same for such arrangements as for the three-pole single-throw contacts which are illustrated in FIGS. 1 through 6. Circuits with one side of the power supply grounded, typicaly are used for low voltage, 120 volt motors.

Figure 7:
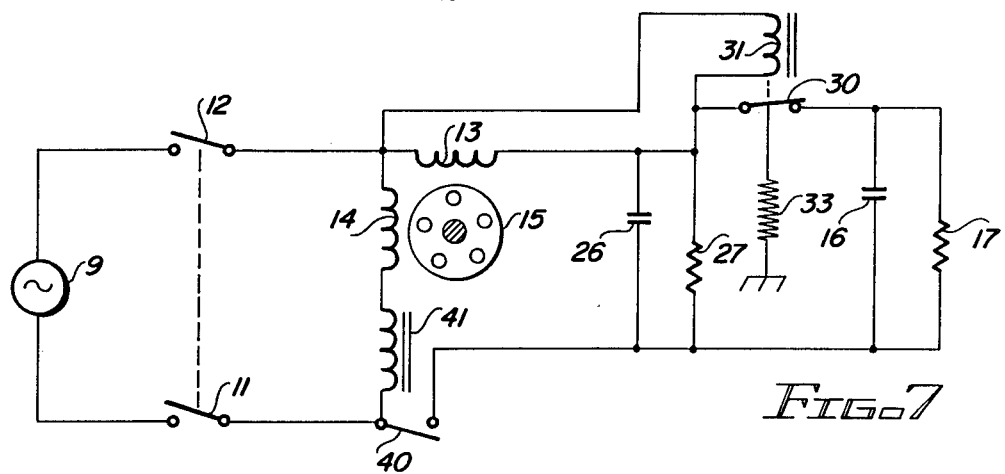
Figure 8:
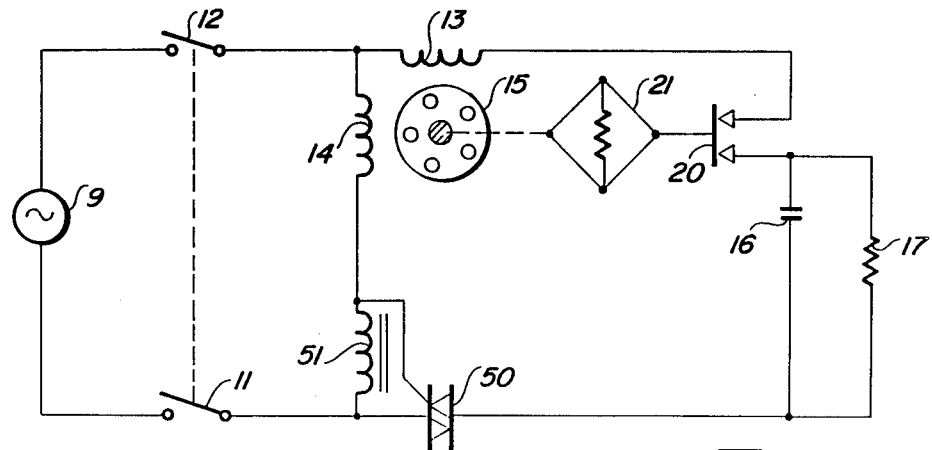
FIG. 8 is a schematic diagram of a further embodiment of a capacitor-start motor according to the invention.

FIGS. 7 and 8 illustrate variations of the circuits of FIGS. 5 and 1, respectively, where the lower switch contact 10 has been replaced with a time delay current relay 40, 41 (FIG. 7) and a solid state current relay 50, 51 (FIG. 8). Reference first should be made to FIG. 7. Those portions of this figure which are the same as FIG. 5 operate in the same manner as the circuit described in conjunction with FIG. 5, and a description of that operation is not repeated here.

When the circuit of FIG. 7 is to be operated, the pair of ganged switch contacts 11 and 12 are closed. This applies operating the current initially through only the run winding 14 and the operating coil 41 of a time delay current relay to close the normally opened contacts 40. This initial current through the run winding 14 causes a slight delay before the circuit is closed thorugh the start winding 13 and the capacitor circuits to initiate the starting operation of the motor. After this, however, the start and run operation is the same as for the motor of FIG. 5. During the run operation of the motor, the run capacitor 26 connected in series with the start winding 13 is connected in parallel (through the now closed contacts 40) with the run winding 14.

When operation of the motor of FIG. 7 is to be terminated, the ganged switch contacts 11 and 12 are opened. This causes an immediate collapse of the operating current through the winding 41, and the switch 40 is opened. As is readily apparent, this isolates the capacitors 16 and 26 from the windings 13 and 14, so that no discharge path is provided from these capacitors through either of these motor windings. Consequently, the capacitors discharge solely through the current dissipating resistors 17 and 27 in the manner described previously.

FIG. 8 is a variation of a capacitor-start motor of the type described previously in conjunction with FIG. 1. The circuit of the figure, however, resembles that of FIG. 7 through the use of a time delay relay similar to the relay 40, 41 of FIG. 7. In FIG. 8, the time delay relay is illustrated as a solid state relay, using a thyristor 40 in place of mechanical contacts 40. The triggering of the thyristor 40 is effected through an operating coil 51, and there is a slight delay upon start up of the motor following closure of the switches 11 and 12. Current through the coil 51 causes the strike-over or avalanche effect to take place in the thyristor 50 to close a circuit through it. Once this has been accomplished, the run operation of the motor of FIG. 8 is the same as described in conjunction with FIG. 1.

When termination of the operation of the motor of FIG. 8 is to be effected, the ganged switch contacts 11 and 12 are opened. This causes a removal of the gate potential from the thyristor 50; and it immediately becomes an open circuit, isolating the capacitor 16 from the run winding 14 and the start winding 13. Consequently, there is no discharge path for the capacitor 16 through either of windings 13 and 14 at and following motor turn off.

The embodiments which have been shown in the drawings and which have been described above are to be considered as illustrative of the invention and not as limiting. For example, various types of switching mechanisms, in addition to the ones disclosed, may be used to isolate the capacitors from the operating windings of the motor when power is disconnected or turned off. Other motor winding configurations in addition to the ones which have been disclosed, may be employed by those skilled in the art without departing from the scope of the invention. The principals of operation also may be employed with either 120 volt or 240 volt motors and also may be used with multi-phase motors by those skilled in the art, if desired. All of these modifications, and others, may be made by those skilled in the art without departing from the true scope of the invention as defined in the appended claims.

I claim:

1. An alternating current motor having a stator core for operation from a source of alternating current power including in combination:
   a rotor for said motor;
   a first winding with first and second ends;
   a second winding with first and second ends;
   first capacitor means with first and second terminals, the second end of said first winding connected in series circuit with said first terminal of said first capacitor means;
   energy dissipation means connected across the first and second terminals of said first capacitor means;
   a source of alternating current power;
   first switch means connected between said source of power and said series connected first winding and first capacitor means for supplying power thereto when said first switch means is closed;
   second switch means connecting said source of power with said second winding means when said second switch means is closed, whereupon with said first and second switch means closed, said series connected first winding and first capacitor means are connected in parallel with said first and second terminals of said second winding across said source of alternating current power;
   means for causing said first and second switch means to be opened together and to be closed together, whereupon said first and second switch means are interconnected in such a manner that with said first and second switch means opened, said first capacitor means is prevented from discharging into either of said first and second windings.

2. The combination according to claim 1 wherein said second switch means comprises a first switch contact connecting the second end of said second winding with the second terminal of said source of power; and a second switch contact connecting the second terminal of said first capacitor means with the second terminal of said source of power, said first and second switch contacts being opened together and closed together.

3. The combination according to claim 2 wherein said energy dissipation means comprises an energy dissipating resistor.

4. The combination according to claim 3 wherein said source of power is single phase alternating current.

5. The combination according to claim 1 wherein said second switch means comprises a first switch contact connected between the second end of said second winding and the second terminal of said source of power, and a second switch contact connected between the second terminal of said first capacitor means and the second terminal of said second winding so that when said second switch contact is open, said first capacitor means is prevented from discharging into either of said windings.

6. The combination according to claim 5 wherein said energy dissipation means comprises an energy dissipating resistor.

7. The combination according to claim 6 wherein said source of power is single phase alternating current.

8. The combination according to claim 1 further including third switch means connected in said series circuit of said first capacitor means and said first winding; and means coupled with said third switch means for causing said third switch means to be closed during starting of said motor and to be opened during normal load conditions of operation of said motor.

9. The combination according to claim 8 wherein said means for causing said third switch means to be opened during normal load conditions of operation of said motor comprises a centrifugal operating mechanism.

10. The combination according to claim 8 wherein said means for causing said third switch means to be opened during normal load conditions of operation of said motor comprises a current responsive relay means.

11. The combination according to claim 1 further including second capacitor means having first and second terminals; and second energy dissipation means connected across the first and second terminals of said second capacitor means, with the first terminal of said second capacitor means connected with the first terminal of said first capacitor means; third switch means connected in series between the second terminal of said second capacitor means and the second terminal of said first capacitor means; and control means coupled with said third switch means for causing said third switch means to be closed during starting of said motor and to be opened during normal load conditions of operation of said motor.

12. The combination according to claim 11 wherein said first and second energy dissipation means comprise first and second energy dissipating resistors, respectively.

13. The combination according to claim 11 wherein said means for causing said third switch means to be opened during normal load conditions of operation of said motor comprises a centrifugal operating mechanism.

14. The combination according to claim 11 wherein said means for causing said third switch means to be opened during normal load conditions of operation of said motor comprises a current responsive relay means.

15. The combination according to claim 11 wherein said second switch means comprises a first switch contact connecting the second end of said second winding with the second terminal of said source of power; and a second switch contact connecting the second terminal of said first capacitor means with the second terminal of said source of power, said first and second switch contacts being opened together and closed together.

16. The combination according to claim 11 wherein said second switch means comprises a first switch contact connected between the second end of said second winding and the second terminal of said source of power, and a second switch contact connected between the second terminal of said first capacitor means and the second terminal of said second winding so that when said second switch contact is open, said first capacitor means is prevented from discharging into either of said windings.

17. An alternating current motor having a stator core for operation from a source of alternating current power including in combination:
a rotor for said motor;
a first winding with first and second ends;
a second winding with first and second ends;
first capacitor means with first and second terminals, the second end of said first winding connected in series circuit with said first terminal of said first capacitor means;
energy dissipation means connected across the first and second terminals of said capacitor means;
a source of alternating current power having first and second terminals; and
a three-pole single-throw switch comprising first, second and third stationary contacts and first, second and third corresponding moveable contacts, said first and second stationary contacts being interconnected to the first terminal of said source of power, and said first and second moveable contacts connected respectively to the second end of said second winding and the second terminal of said first capacitor means, said third fixed contact being connected to the second terminal of said power supply, and said third moveable contact being connected in common to the first terminals of said first and second windings.

18. An alternating current motor having a stator core for operation from a source of alternating current power including in combination:
a rotor for said motor;
a first winding having first and second ends;
a second winding having first and second ends;
first capacitor means having first and second terminals, the second end of said first winding connected in series circuit with said first terminal of said first capacitor means;
energy dissipation means connected across the first and second terminals of said first capacitor means;
a source of alternating current power having first and second terminals;
a single-throw switch having at least two poles with first and second stationary contacts and first and second moveable contacts, said first and second stationary contacts being interconnected to the first terminal of said power supply, and said first and second moveable contacts connected respectively in series circuits with said first and second windings so that when said first and second moveable contacts are disconnected from said first and second fixed contacts, said first capacitor means is prevented from discharging into either of said first and second windings; and
means for connecting said second terminal of said power supply in electrical operating circuit with said second terminal of said capacitor means and said first and second windings.

* * * * *